United States Patent [19]

Valles

[11] Patent Number: 5,683,729

[45] Date of Patent: Nov. 4, 1997

[54] APPARATUS FOR MAKING CONTAINERS BY BLOW MOULDING PLASTIC PARISONS

[75] Inventor: Thierry Valles, Le Havre Cedex, France

[73] Assignee: Sidel S.A., Le Harve Cedex, France

[21] Appl. No.: 564,318

[22] PCT Filed: Aug. 24, 1994

[86] PCT No.: PCT/FR94/01022

§ 371 Date: Dec. 20, 1995

§ 102(e) Date: Dec. 20, 1995

[87] PCT Pub. No.: WO95/05933

PCT Pub. Date: Mar. 2, 1995

[30] Foreign Application Priority Data

Aug. 26, 1993 [FR] France ................. 93 10265

[51] Int. Cl.[6] .............. B29C 49/64; B29C 49/48
[52] U.S. Cl. ............ 425/526; 264/535; 264/538; 425/534
[58] Field of Search ................. 425/534, 526, 425/529; 264/535, 538

[56] References Cited

U.S. PATENT DOCUMENTS

| | | | |
|---|---|---|---|
| 3,596,315 | 8/1971 | Yoshikawa et al. | 425/527 |
| 3,850,566 | 11/1974 | Moore | 425/534 |
| 4,035,463 | 7/1977 | Rosenkranz et al. | 264/535 |
| 4,214,860 | 7/1980 | Kleimenhagen et al. | 425/534 |
| 4,310,282 | 1/1982 | Spurr et al. | 425/533 |
| 4,313,720 | 2/1982 | Spurr | 425/526 |
| 4,313,905 | 2/1982 | Hafele | 425/534 |
| 4,355,968 | 10/1982 | Lagoutte et al. | 264/535 |
| 4,391,578 | 7/1983 | Schaar | 425/525 |
| 4,479,772 | 10/1984 | Kleimenhagen | 425/534 |
| 4,790,741 | 12/1988 | Takakusaki et al. | 425/534 |
| 5,110,282 | 5/1992 | Voss | 425/534 |
| 5,116,217 | 5/1992 | Doudement et al. | 425/534 |
| 5,308,233 | 5/1994 | Denis et al. | 425/534 |

FOREIGN PATENT DOCUMENTS

| | | |
|---|---|---|
| 2630414 | 10/1989 | France . |
| 2905376 | 8/1980 | Germany . |
| 3529716 | 3/1987 | Germany . |
| 955391 | 4/1964 | United Kingdom ........ 264/535 |

Primary Examiner—Robert Davis
Attorney, Agent, or Firm—Sughrue,Mion,Zinn,Macpeak & Seas, PLLC

[57] ABSTRACT

A machine manufactures containers such as bottles, pots, or other hollow bodies by thermal conditioning and blow molding of plastic preforms. The machine has two portfolio molds on the periphery of a carousel, and each has at least two molding cavities. The machine also has a device for steering and for holding the preforms on a path between thermal conditioners. The preforms are separated at a pitch that is less than that of the molding cavities. The machine features a device for changing the pitch of the preforms between the steering device and the mold.

23 Claims, 4 Drawing Sheets

APPARATUS FOR MAKING CONTAINERS BY BLOW MOULDING PLASTIC PARISONS

BACKGROUND OF THE INVENTION

The present invention relates to a plant for manufacture of containers such as bottles, pots, or any other type of hollow body, by thermal conditioning followed by blow moulding of plastic preforms.

It applies in particular to the manufacture of containers in polyethylene terephthalate (PET), obtained by draw-moulding of preforms after they are subjected to appropriate thermal conditioning.

Known manufacturing plants for blow moulding of preforms comprise a station for thermal conditioning of preforms, where the preforms are brought to a temperature at which they can then be deformed by blow moulding, a station supplying preforms to this conditioning station, a blow moulding station having moulds whose recess exhibits the finished external form of the container to be produced, and a transfer station for preforms between the thermal conditioning station and the blow moulding station.

For the majority of materials, and particularly PET, it is preferred to draw the preform in a controlled manner and concomitant with blow moulding. In this case, the blow moulding station is replaced by a drawing blow moulding station, simultaneously comprising drawing means such as an extension rod which embosses the floor of the preform in a controlled manner during blow moulding.

In the following description, the term blow moulding applies equally to pure blow moulding or to drawing blow moulding.

Various types of manufacturing plants already exist. In a known type of plant the blow moulding station is constituted by a device mounted to rotate around a vertical axis. By virtue of its circular movement, this device, known as blow moulding wheel or carousel, comprises at least two identical moulds, each having a moulding cavity, distributed symmetrically and regularly relative to the axis of rotation and each borne by a die support device.

Consequently, if there are two moulds, they are diametrically opposed; more generally, they are offset at an angle A determined by the following equation: $A=360°/n$, in which n is the number of moulds.

Each mould is formed from two half moulds articulated around another vertical axis supported by the carousel and mounted such that the moulds open like a wallet, along a radial symmetry plane, passing through the axis of revolution of the carousel and through the axis of articulation of the half moulds; they open in the direction of the periphery of the blow moulding mould.

It is known for these plants to produce high cycle rates; therefore, with materials such as PET and the current thermal conditioning processes, as many as 1100 containers can be manufactured per hour utilising drawing blow moulding and moulds, with the overall capacity of the plant depending on the number of moulds supported by the carousel. By way of example, the largest plants currently being operated by the applicant carry 40 moulds.

In plants of this type the thermal conditioning station comprises supports, each of which is adapted to receive and grip a preform, firmly though removably, and which are fitted between them to constitute an endless device. The endless device may be constituted by a carousel, or then again in the manner of a chain supported by at least two driving pinions. The preforms are held in these devices by means such as a mandrel with an elastic ring and introduced into their openings. Furthermore, the supports are fitted into the thermal conditioning station such that the preforms can be heated there with the opening—the neck—facing downwards to avoid any deformation, by convection, of this opening during thermal conditioning. In effect, the opening of the preform corresponds already to that of the finished container.

Moreover, known plants are preferably equipped in such a way that after thermal conditioning the preforms are turned over so that their opening is uppermost, so that they are not deformed under their own weight and because of their softness prior to blow moulding of the containers. In this case, they can be turned upright in the thermal conditioning device, or in the transfer station.

A major drawback to these plants is that they are usually built around a basic mechanical and hydraulic structure (carousel, motors, die supports, and the like) of such a size to enable those containers to be manufactured which are of significant size or volume and/or which require for their blow moulding certain parameters—especially pressure—of increased value. Customisation is then carried out at the request of the user of the plant, which consists of, amongst others, providing the plant with moulds, each of which has a cavity adapted to the containers to be produced, and controlling the moulding and thermal conditioning parameters as a function of the preforms used and the desired finished containers.

If the containers to be produced are small in size or require only slight blow moulding pressure, the plant can appear to be oversize relative to these containers.

SUMMARY OF THE INVENTION

The object of the present invention is to rectify these drawbacks.

According to the present invention a production plant for containers by blow moulding of preforms, comprising at least two moulds arranged on the periphery of a carousel, is characterised in that the moulds are of the wallet type, with each comprising at least two moulding cavities.

A particular advantage of the invention is that it enables the characteristics of the plant to be exploited best.

In particular, if it is calculated that at each rotation of the mould a plant can produce in each mould a single container having a maximum determined volume, the invention allows customisation of the plant so that several containers of smaller volume are produced in each mould at each rotation, due to several cavities in each mould.

Another advantage of the present invention is that it enables an increase especially of the production cycles, since the overall number of moulding cavities is increased.

According to another characteristic the plant comprises a drive device for preforms on a travel path, along which are arranged thermal conditioning means and in which the clearance between the longitudinal axes of two successive preforms is less than that between the longitudinal axes of two adjacent cavities of the same mould, and it comprises means for modifying the clearance of the preforms between the drive device and a mould. Due to such an arrangement, the preforms can be very close to each other in the thermal conditioning station, such that the latter can be as compact as possible, considering the desired production rate of the plant, and the preforms can be separated prior to being introduced into the mould with respect for their radial expansion during blow moulding.

Other characteristics and advantages of the invention will emerge from the following description with reference to the accompanying diagrams, in which:

DETAILED DESCRIPTION OF THE PREFERRED EMBODIMENT

According to the embodiment illustrated in FIGS. 1 to 5, the present invention relates to a plant for manufacturing containers by blow moulding of plastic preforms 1, the latter being produced by injection moulding in an injection moulding machine.

Figure 1:
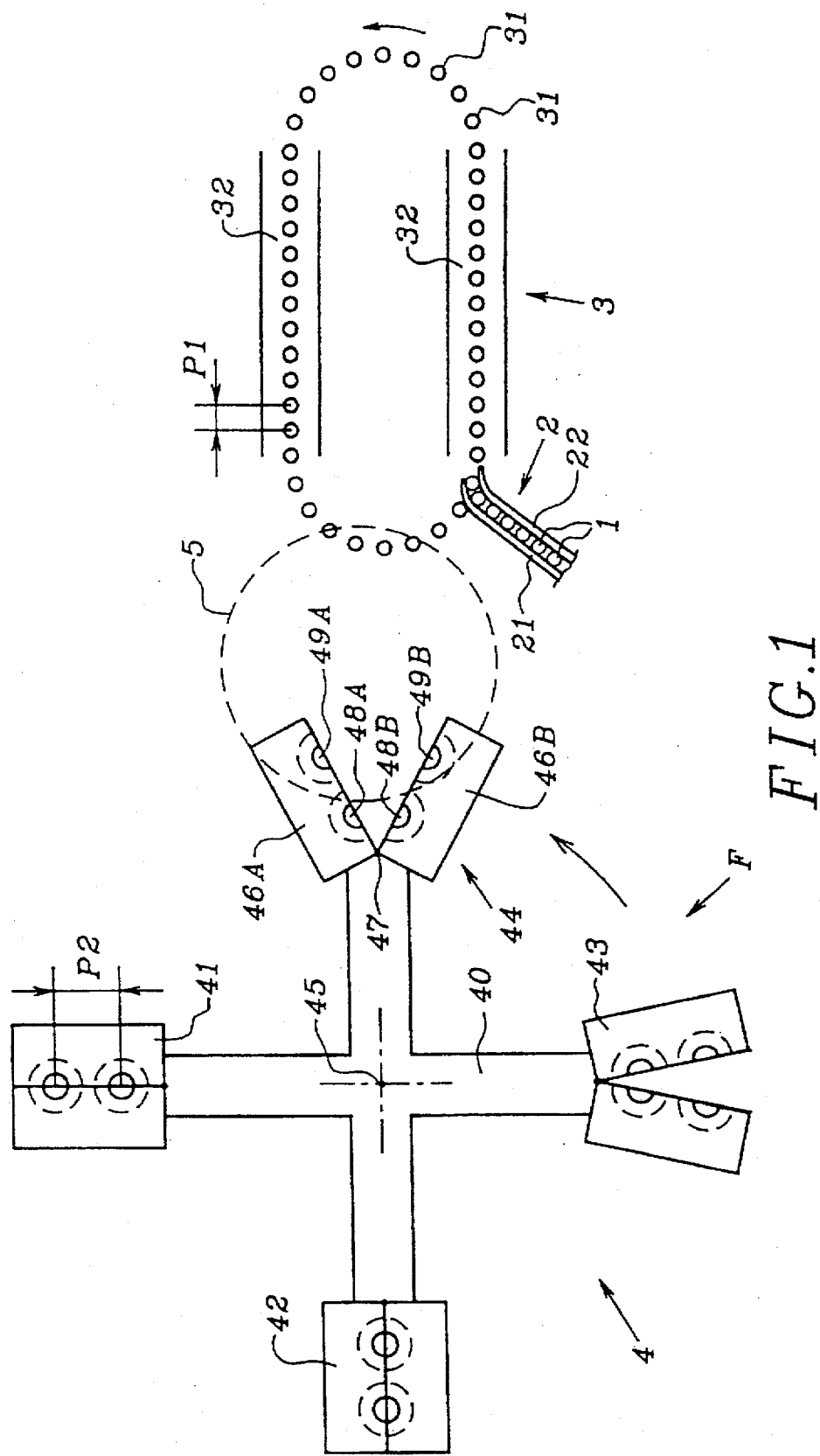
FIG. 1 is a skeleton diagram of a plant according to the present invention.

With reference to FIG. 1, the preforms thus produced are supplied by one or more storage containers (not illustrated) by a supply device 2 such as a chute, to a thermal conditioning device 3 such as an infrared radiation furnace, where they are heated to the required temperature for blow moulding. In a known manner conditioning device 3 is constituted by an endless chain 31 with reels evenly spaced at a pitch of P1 and each designed to take up a preform; they also comprise one or more zones 32 having infrared heating means (not illustrated), in front of which the preforms are exposed during circulation of the endless chain.

To prevent softening of the necks of the preforms thermal conditioning device 3 preferably comprises means for reversing the reels to enable each of the preforms, after they have been loaded with their opening uppermost, to be each carried throughout the entire thermal treatment with their opening facing downwards and their base facing upwards. The introduction of each preform with its opening facing upwards is ensured by a flange located beneath their opening, enabling it to be supported in slide rails 21, 22 of supply device 2. Next, before it encounters a first heating zone 32, each preform is attached solidly to a reel by covering its neck with known elements such as a mandrel and an elastic ring each belonging to the respective reel, then upturned so that the opening now faces downwards.

After undergoing thermal treatment and after the opening has been returned upwards, each preform is separated from the reel carrying it by stripping, that is, withdrawal of the mandrel and the elastic ring from its neck, before being transferred to a blow moulding station or device 4 by means of an interface device 5 which will be described in greater detail hereinbelow. Following blow moulding, the containers thus produced are removed by an appropriate device—not illustrated in the skeleton diagram—and placed at the site of arrow F.

In accordance with the present invention, blow moulding station 4 is constituted by a revolving carousel or platen 40 carrying at least two moulds 41, 42, 43, 44 of the wallet type, distributed symmetrically and evenly around vertical axis of rotation 45 of the carousel, each comprising at least two moulding cavities.

Each mould 41, 42, 43, 44 is formed out of two half moulds 46A, 46B, articulated to open and close by means of known elements (not illustrated) round an axis 47 borne on the carousel. By way of non-limiting example, opening and closing of the moulds can be ensured by means which are identical or equivalent to those described in the French patent published under number 2 479 077, incorporated here for reference, that is, by a mechanism comprising a journal arm in carousel 40 and controlled by a roller cooperating with a fixed cam relative to the carousel.

Each half mould comprises as many half cavities as the mould itself has cavities. In the example illustrated where each mould comprises two cavities, each half mould 46A, 46B comprises two half cavities 48A, 49A; 48B, 49B respectively.

Irrespective of the finished shape of the container to be produced, preferably or essentially when the finished shape prohibits easy stripping of the mould (petaloid bottom, for example), each mould is associated with means for closing the bottom.

In thermal conditioning device 3 the preforms are continually spaced at a first pitch P1, where the pitch or the clearance is defined as being the distance separating the longitudinal axis of two successive preforms, or similarly, the distance separating the longitudinal axis of the supports of two successive preforms in this device. In blow moulding station 40, two successive cavities of the same mould are spaced at a second pitch P2, greater than first pitch P1, calculated to take into account the radial expansion of the preforms during blow moulding and the necessity of leaving sufficient thickness of material between two cavities so that the mould has correct mechanical resistance during blow moulding. As mentioned previously, the preforms are as close as possible to each other in the thermal conditioning device, and the clearance there is thus less so that the latter is of the smallest size possible, considering the desired overall rate for the plant. As a consequence, interface device 5 comprises means for ensuring modification of the clearance and transfer of the preforms between the thermal conditioning device and blow moulding station 40.

By way of example, first pitch P1 can be of the order of 50 millimeters and second pitch P2 can be of the order of 80 millimeters or more.

Figure 2:
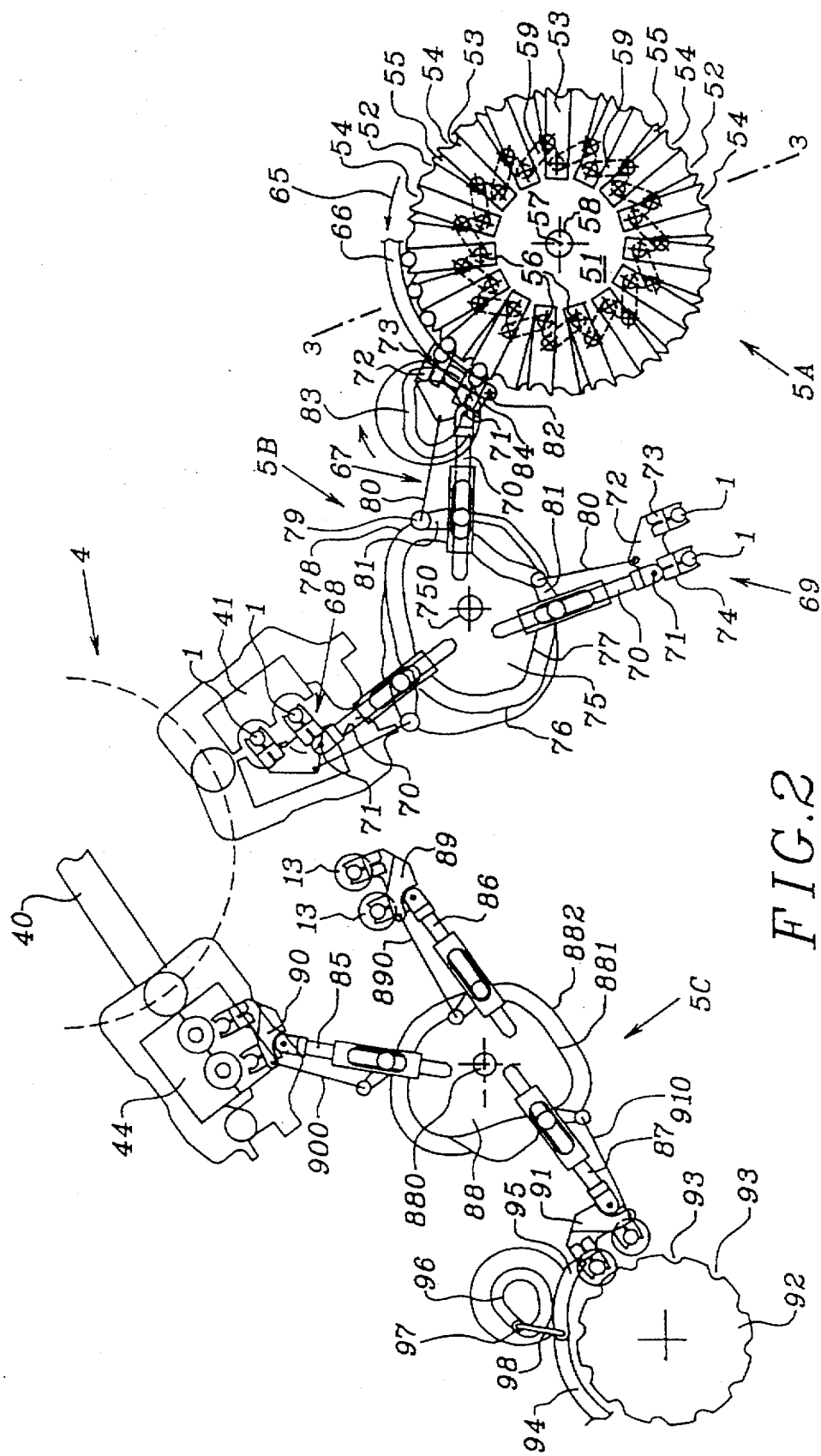
FIG. 2 is a plan view of the preferred embodiment of the mechanisms for changing the clearance and transferring the preforms into the moulds, and of the mechanism for freeing the containers.
Figure 3:
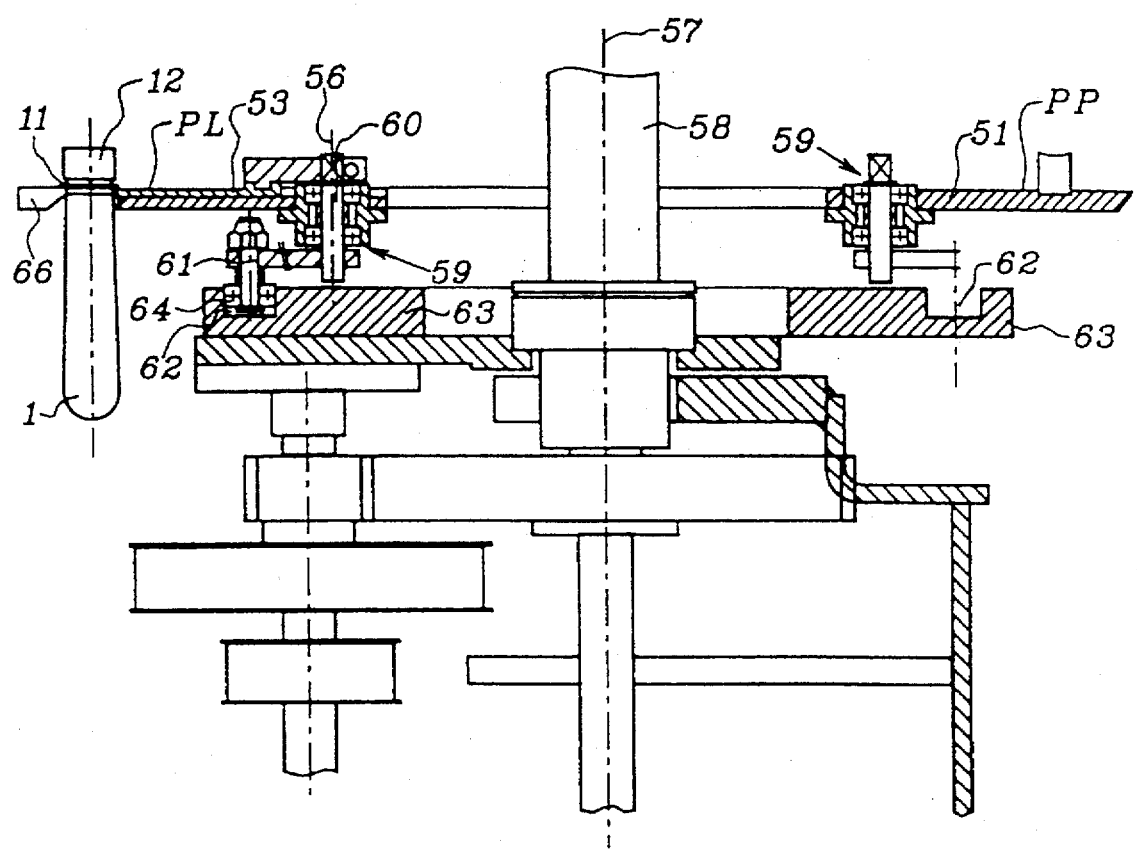
FIG. 3 is a view through section AA of FIG. 2 of the clearance-changing mechanism.

FIGS. 2 and 3 illustrate a preferred embodiment of the interface device which is adapted to hold and transfer preforms in double-cavity blow moulding moulds.

In this particular embodiment, interface device 5 comprises at least two complementary elements: a first element 5A where the preforms arrive at pitch P1, then are separated after stripping to pass onto second pitch P2, and a second element 5B comprising at least one transfer device for gripping preforms 1 after they have been placed at second pitch P2 and for transferring them into the moulds.

First element 5A is made up of a revolving platen 51 (designated as wheel by virtue of its substantially circular shape) provided over its periphery with alternating, fixed elements 52 for holding the preforms, such as slotted scalloped notches and mobile elements provided with a holding element 54 such as scalloped notches. The clearance between the centres of two fixed successive elements 52 is such that the arc of the circle connecting these two elements is of a length double first pitch P1. As shown in FIG. 3, fixed holding elements 52 and mobile elements 54 ensure that preforms are gripped thanks to a flange 11 located under their neck.

The fixed elements are incorporated directly on the periphery of the platen, in its mass. The platen comprises sectors which are evenly spread through its thickness and which exhibit identical radial recesses 55 each opening into a space between two successive fixed elements 52, while mobile elements 53 are constituted by identical blades, for example in a substantially rectangular shape, each of which is disposed between recesses. Element 54 for holding the preforms associated with a blade is incorporated at the end of the latter, and the opposite end is rotatably mounted about an axis 56 on platen 51. In addition, axes of rotation 56 of the set of blades are spaced evenly over platen 51 and delimit a circle concentric to axis of rotation 57 of platen 51. Because of this arrangement, any rotary movement of a blade about its axis causes a variation in the clearance between associated holding element 54 and two fixed holding elements 52 located on either side of the blade on platen 51. As will be demonstrated hereinbelow, rotation of the blades is guaranteed by control means connected to the blades and to a fixed pan of the plant, such that the angular position of a blade relative to the platen depends, at any given moment of rotation of the platen, on the angular position of the platen relative to the plant.

Rotation of platen 51 about its axis 57, when synchronised with the remainder of the plant, is ensured by a shaft 58 which receives the rotary movement from the plant motor, not illustrated here, by way of means known in and of themselves—belts, pinions or the like—also not illustrated.

Each blade 53 is connected to a crank 59, which is separate yet identical to all blades, to ensure its rotation and thus the changing of pitch. More accurately, first end 60 of the crank connected to a blade is integral with axis of rotation 56 of this blade, and second end 61 is engaged in a guide cam 62 which is integral with the structure of the plant, and thus fixed relative to the plant itself. In the embodiment illustrated in FIGS. 2 and 3, cam 62 is constituted by a groove accommodated in the thickness of a fixed platen 63 arranged around drive shaft 58 of rotary paten 51 below the latter and in a plane parallel thereto. The groove forms a loop closed around the shaft and presents variations in its radius of curvature, such that when rotary platen 51 is driven in rotation, the second end of each crank follows the variations of the curvature of the cam accommodated in the fixed platen. Accordingly, each time the second end of a crank encounters a change in the curvature of the cam, the result is rotation of its first end 60, thus the movement of the associated blade and consequently a variation in the clearance between element 54 borne by blade 53 and fixed holding elements 52 located on both sides of this blade. Now, since all the blades are fixed and articulated in the same way on the rotary platen (axes of rotation borne by a circle concentric to the axis of the platen and identical cranks), they all have identical kinematics, though dephased from one blade to another.

Preferably, as illustrated by FIG. 3, which is a view through section AA of FIG. 2, second end 61 of each crank is guided in the cam by means of a roller 64 mounted around this end.

As shown in FIG. 3, the thickness of blades 53 or similarly the depth of recesses 55 is such that the fixed notches and the mobile notches carry the preforms at the same level so that they can be introduced at the same level into the moulds.

In the illustrated example upper plane PL of blades 53 is aligned with upper plane PP of the non-recessed sectors of the platen so that preforms 1 can be held at the same level due to their flange 11 which is located under their neck 12, as much in fixed holding elements 52 as in mobile holding elements 54.

Since the change of pitch cannot occur until after stripping, it is evident from FIGS. 2 and 3 that fixed holding elements 52 and mobile holding elements 54 of wheel 51, constituted by the scalloped notches, are not enough to hold the preforms after stripping. For this reason their action is completed by an additional holding element 66, preferably constituted by a segment of a circular crown which is active after stripping and in the zone where the pitch change occurs, up to the point where the preforms are gripped by second element 5B. The clearance between this segment of crown and the notches is such that the preforms can slide along this element when wheel 51 turns, each still being held by their neck between a fixed or mobile notch in accordance with their respective position, and this element 66.

As previously indicated, interface device 5 comprises, complementing pitch-changing element 5A, at least a second element 5B for gripping preforms 1 at second pitch P2 and transferring them into the moulds. Consequently, if wheel 51 of pitch-changing element 5A turns in the direction shown by arrow 65 in FIG. 2, cranks 59 and cam 62 are fitted so that fixed holding elements 52 and mobile holding elements 54 can pass preforms 1 from first pitch P1, from which they are spaced upstream of the zone where second element 5B grips preforms 1, to second pitch P2 in this zone.

As shown in FIG. 2, second element 5B comprises at least one transfer element 67, 68, 69. By virtue of the increased rates of the plant several identical elements are preferably present. In the example shown in FIG. 2, there are three elements.

Each element comprises an arm 70 having a first end, on which is rotatably articulated, by a pivot 71, a support 72 carrying the same number of pairs of pincers 73, 74 as each carousel mould 4 has cavities. Therefore, in the embodiment shown in FIG. 2, each arm supports two pairs of pincers, the centre ones of which are separated from second pitch P2.

Preferably, each pair of pincers is constituted in the same way as those found in known plants comprising a single mould per cavity, that is, they may be pairs of pincers whose opening and closing is controlled by a system of cams, rollers and springs, or more simply, as in the embodiment illustrated in FIG. 2, pairs of pincers having springs which open due to the force exerted by the neck of the preforms, just when the preforms are introduced or extracted from them, and which close under the action of the springs which connect them to their support. These two types of pairs of pincers are well known and will not be described in any further detail.

The second end of arm 70 is mounted in rotation and translation on a support 75, itself turning about an axis 750 in synchronicity with the remainder of the plant. The rotation and translation movements of the second end of the arm are ensured, in a known manner, by fixed cams 76, 77 relative to the plant, driving rollers connected to the arm and guided by these cams.

This arrangement is made especially so that when the preforms are gripped, the movement of the first end of the arm is controlled by rotation of the platen, effectively allowing the first end, and thus the pincers, to accompany the platen over a sufficient distance to ensure a perfect grip.

This arrangement is also made so that a second automatic control between the movement of the first end of the arm and a die support takes place during transfer of the preforms into the cavities of the mould, ensuring perfect positioning of the preforms in the cavities.

Furthermore, the variation in the length of the arms, permitted by the movements of rotation and translation, allows optimisation of the spatial requirement of these arms during rotation between the moment of gripping and the moment of transfer.

However, given that each arm bears at least two pincers, it is possible that the sole automatic control of the first end of arm 70 is not enough to ensure gripping of pitch-changing wheel 51 or correct transfer of the preforms into the moulds. This is why the movements of rotation and translation of the arm are accompanied by rotation of a support 72 of the pairs of pincers relative to this arm, permitting correct positioning of the pincers and accompanying of the movement as much of the platen during gripping of the preforms as of the moulds during transfer and their closure.

This rotation of support 72 of the pincers is generated by a third cam 78 which is fixed relative to rotary support 75, which in turn drives another roller 79 connected to a first end of a first connection rod 80, whose second end is connected to support 72 of the pincers, and by a second connecting rod 81 connecting roller 79 to second end of arm 70.

FIG. 2 shows one of the three transfer arms in a mould 41.

The end of holding element 66, complementing the fixed or mobile notches, is preferably prolonged by a mobile part 82 which retracts after the preforms have been gripped by the pincers to allow more rapid disengagement of the preforms and avoiding having to prolong the accompanying movement of the platen until the last preform being gripped is completely disengaged from this holding element. In the embodiment illustrated, this mobile part 82 is a segment of a crown rotatably mounted on complementary holding element 66, also in the shape of a crown. When the pincers connected to an arm have yet to grip the preforms, mobile part 82 extends the complementary element. As soon as gripping takes place, mobile pan 82 moves away.

A cam 83 turning synchronously with the plant drives a connecting rod 84 which is connected to mobile part 82. The profile of the cam is such that mobile part 82 remains in a position holding the preforms before gripping, then moves away after gripping and returns to the close position until the following preforms are gripped.

After blow moulding in the moulds, containers 13 are freed with the assistance of a device 5C which comprises one or more transfer elements having a structure similar to that of 67, 68, 69 which load the preforms. These elements comprise one or more arms 85, 86, 87 each of which is mounted in rotation and translation about a single support 88, itself revolving around an axis 880; articulated to each arm is a support 89, 90, 91 with as many gripping means, such as pairs of pincers, as there are cavities in each mould. The pincers grip containers 13 by their neck in known fashion.

A mechanism having cams 881, 882, rollers and connecting rods 890, 900, 910 allows the movement of the pincers to be controlled by rotation of a mould during orientation necessary for good gripping of the containers, and allows the containers to be freed, while controlled by its movement, onto a wheel 92 with notches 93 and a support 94 in the shape of a segment of a crown complementary to the notched wheel.

An element 95 in the form of a segment of a crown preferably prolongs complementary support 94. This element is connected to a mechanism having a cam 96, a roller 97 and connecting rod 98, of which the cam is driven synchronously with the remainder of the plant. Element 95 disengages under the action of the mechanism with cam 96, roller 97 and connecting rod 98 at the very time when the pincers arrive at the notched wheel and draws near when they are well engaged to facilitate gripping of the containers by the notched wheel. The containers steered by their necks between the notched wheel and complementary element 93 are then extracted by the force of the pincers while the transfer element continues to rotate in a crosswise direction.

Figure 4:
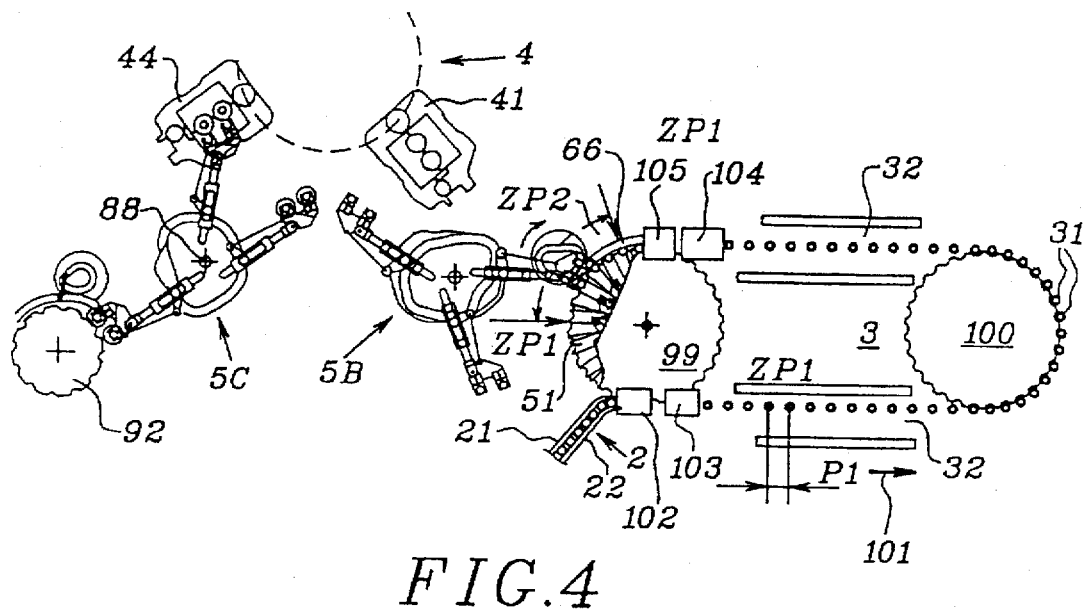
FIG. 4 is a preferred lay-out view of the elements of FIGS. 2 and 3 in a plant having a linear thermal conditioning device.

FIG. 4 illustrates a preferred lay-out of the elements in FIGS. 2 and 3, where thermal conditioning device 3 is of the linear type, that is, in which endless reel chain 31, of known structure, has at least two linear sectors accommodating heating zones 32 and is held between two platens or wheels, the first of which 99 serves to drive this chain synchronously with the remainder of the plant, and a second 100 serves to tense and return the chain.

In this case, pitch-changing device 5A, constituted by variable pitch notched wheel 51 of FIG. 2, is arranged coaxially to first platen 99 for driving reel chain 31 underneath the latter, and is driven along with it, as is a fixed notch wheel in known installations of the prior art. As explained hereinafter, this arrangement enables this variable pitch wheel 51 to be used for closing the mould and for stripping.

In FIG. 4 first platen 99 is shown in an exploded view so that variable pitch notched wheel 51 can be seen.

Assuming that thermal conditioning device 3 is driven in the direction indicated by arrow 101, supply device 2 directs preforms 1, with their openings facing upwards, to a point in zone ZP1 of the plant where the pitch between fixed notched 52 and mobile notches 54 is first pitch P1, that is, that of thermal conditioning device 3, such that each notch—and thus each preform arriving on wheel 51 in this zone ZP1—compared to moulding means, for example constituted by a mandrel and an elastic ring, is of a reel.

Each preform presenting in the supply device is then clamped by a fixed or mobile notch, then steered towards a moulding zone 102 by known means such as a device with cams (not illustrated) which lowers into the neck of the preforms a mandrel and the elastic ring associated with each successive reel.

Next, the preforms pass into a zone 103 where they are upturned so that their base now faces upwards in heating zones 32.

Following thermal conditioning and before arriving back on wheel 51 with fixed notches 52 and mobile notches 54, the reels are again upturned by a device 104, also known, so that the preforms now have their base facing downwards, before returning to contact notched wheel 51.

Then—while still in zone ZP1 where the pitch between the notches is first pitch P1—after being located between a notch and complementary holding element 66, constituted in FIG. 2 by a segment of a circular crown, each preform is subjected to stripping of its neck in a zone 105. Each preform is then carried solely by its neck between a notch and complementary holding element 66.

The preforms then enter a zone ZP2 where they undergo changing of pitch before being gripped by second element 5B comprising at least one transfer device for gripping the preforms and conveying them to the moulds.

The result of the above is that with this particular embodiment cam 62 guiding cranks 59 must be profiled so that the holding elements, such as fixed or mobile notches, are at first pitch P1 at least during moulding and stripping.

Furthermore, this cam must be profiled such that the holding elements are at second pitch P2 at least when pincers 73, 74 of the device for transferring the preforms towards the moulds are in contact with the preforms.

On the contrary, it is unnecessary though preferable for the cam to be profiled so that the preforms are supplied to a zone where the holding elements are at first pitch P1; in fact, it is quite conceivable that the preforms are supplied to a zone where the pitch is second pitch P2, while pitch P1 is returned to between the moment when the preforms are clamped by a notch and placed into the mould.

In a variation, not illustrated, supply device 2 of the preforms steers the preforms, not directly on pitch-changing path wheel 51, but on an intermediate loading path.

Figure 5:
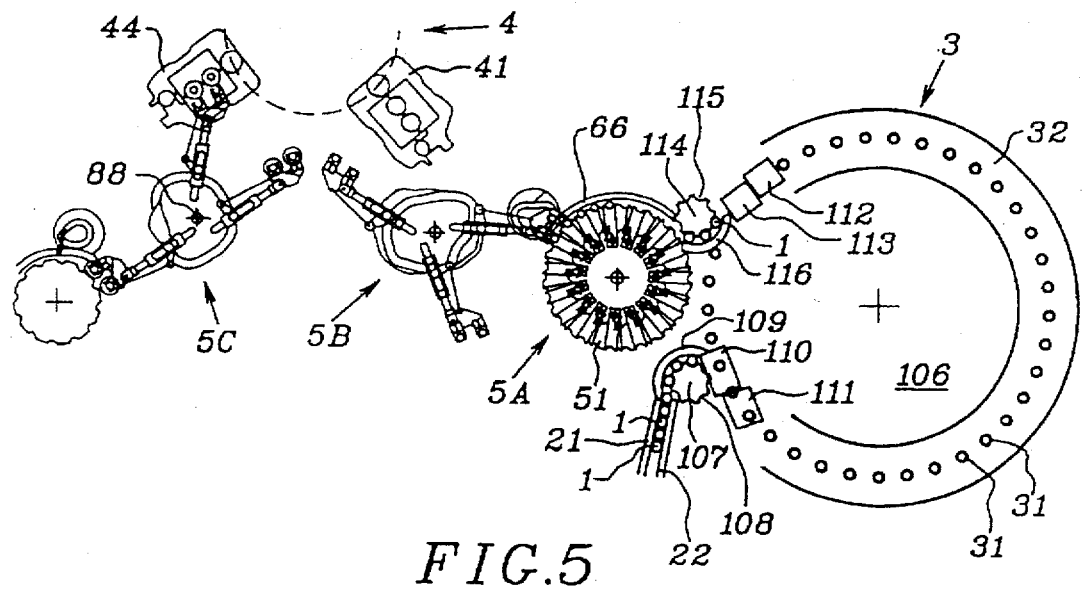
FIG. 5 is a possible lay-out view of the elements of FIGS. 2 and 3 in a plant having a circular thermal conditioning device.

FIG. 5 illustrates a possible lay-out of the elements of FIGS. 2 and 3 in an installation in which the thermal conditioning device is a carousel 106.

The means of loading, moulding and conditioning are known means. Therefore, supply device 2 steers preforms 1 onto an intermediate wheel 107 with notches 108 and onto a support 109 in the form of a segment of a crown. Each preform, carried by its flange 11 on a notch 108 and on support 109, is steered towards a moulding zone 110, then to a reversal zone 111, preceding thermal conditioning zones 32.

After thermal conditioning, the preforms end up in a reversal zone 112, then are stripped at 113 immediately before being clamped between notches 114 of another intermediate wheel 115 and a support 116 in the shape of a segment of a crown.

Wheel 51 with fixed notches 52 and mobile notches 54 as well as complementary holding element 66, constituted by a segment of a circular crown, are located immediately downstream of intermediate wheel 115 and support 116, such that the performs, guided between notches 114 of this wheel 51 and support 116, can be transferred from this wheel and from this support between fixed notches 52 and mobile notches 54 and complementary holding element 66 in order to make the change in pitch.

Downstream of wheel 51 with fixed and mobile notches is second element 5B for gripping preforms 1 after they have been set at second pitch P2 and transferring them into the moulds.

Of course, the invention is in no way limited to the embodiments described or claimed herein, rather it includes their equivalents and all the variations or adaptations which would be within the scope of the skilled expert.

I claim:

1. A machine for the production of containers by blow-molding preforms, comprising:
    at least two portfolio molds arranged on the circumference of a blow-molding rotating conveyor, wherein each of the molds comprises at least two molding cavities whose longitudinal axes are spaced apart by a first distance,
    a drive device transporting and holding the preforms on a path along which heat-processing means are positioned, wherein two successive preforms have, between their respective longitudinal axes, a first spacing smaller than said first distance,
    a spacing modifying device receiving said two successive preforms and positioning said two successive preforms to have, between said respective longitudinal axes, a second spacing substantially the same as said first distance, and
    means for transferring said two successive preforms to said at least two molding cavities.

2. A machine according to claim 1, wherein said first distance is calculated based on the radial expansion of the preforms during the blow-molding operation, and a thickness of material to be left between said at least two molding cavities sufficient to ensure that the mold has the proper mechanical strength during the blow-molding operation.

3. A machine according to claim 1, wherein said spacing modifying device comprises means for unloading each preform from the drive device, and wherein said means for transferring transfers said two successive preforms to a predetermined position of said at least two molding cavities.

4. A machine according to claim 3, wherein said unloading means ensure said modification of the spacing.

5. A machine according to claim 4, wherein said means for transferring comprises first preform-transfer means for grasping said two successive preforms from said spacing modifying device and placing them in the molds.

6. A machine according to claim 4, wherein said spacing modifying device comprises a rotating plate incorporating, on its circumference, alternating stationary and mobile preform-retention elements.

7. A machine according to claim 6, wherein the stationary and mobile elements are slots, and wherein said machine incorporates an additional retention element formed by a portion of a circular ring allowing the preforms to be held by collars thereof between the slots and said additional retention element between the moment the mold is opened and the moment the preforms are grasped by the first transfer means.

8. A machine according to claim 7, wherein the rotating plate is circular and wherein the stationary slots are distributed evenly and formed directly within the plate mass and on the circumference thereof.

9. A machine according to claim 7, wherein the mobile slots are produced in identical plates mounted in a rotating configuration on the plate, and wherein said machine comprises positioning means configured in such a way that, at all times, the position of one plate in relation to the stationary slots located on either side of this plate is dependent on the position of the rotating plate in relation to the machine.

10. A machine according to claim 9, wherein the rotating plate comprises, spaced evenly apart in its thickness, sectors incorporating identical radial recesses, each of which is formed in the gaps between two successive stationary slots, wherein the plates are positioned in this radial recesses, and wherein the depth of the recesses is such that the stationary and mobile slots transport the preforms at the same height.

11. A machine according to claim 10, wherein the axes of rotation of all of the plates are evenly spaced apart on the rotating plate and delimit a circle concentric to the axis of rotation of this plate.

12. A machine according to claim 9, wherein each plate is associated with a respective crank, in order to ensure the rotation thereof and, accordingly, the change of spacing, a first end of the crank associated with a plate being integral with the axis of rotation of this plate, and a second end being engaged in a guide cam made integral with the frame of the machine.

13. A machine according to claim 12, wherein the guide cam is formed by a groove forming a closed loop and has the thickness of a stationary plate arranged around the drive shaft of the rotating plate in a plane parallel to the latter and exhibiting variations of its radius of curvature, so that, when the rotating plate is driven in rotation, the second end of each said crank follows the variations of the curvature of the cam provided in the stationary plate, thus actuating the rotation of the associated cam and, therefore, causing a variation of the spacing.

14. A machine according to claim 5, wherein the first transfer means comprises at least one first arm of which a first end supports as many preform-gripping means as there are cavities in one of said molds, the spacing between the centers of two successive gripping devices being identical to the spacing between the longitudinal axes of two successive cavities in a single mold.

15. A machine according to claim 5, further comprising second transfer means designed to unload containers from the molds.

16. A machine according to claim 15, wherein the second transfer devices comprise at least one second arm of which a first end supports as many container-gripping devices as there are cavities in one of said molds, the spacing between the centers of two successive gripping devices being identical to the space between the longitudinal axes of two successive cavities in a single mold.

17. A machine according to claim 14, further comprising:
said preform-gripping means being borne by a first support mounted so as to rotate on the first end of the first arm,
said container-gripping means being borne by a second support mounted so as to rotate on the first end of the second arm.

18. A machine according to claim 17, wherein:
the second end of the first arm is mounted on a third support rotating around an axis parallel to that of the rotating conveyor supporting the molds,
the first end of the second arm is mounted on a fourth support rotating around an axis parallel to that of the rotating conveyor supporting the molds, and
said machine comprises means for ensuring that one of the first and second arm executes movements of rotation and translational motion in relation to their respective rotating supports.

19. A machine according to claim 18, wherein the rotational movements of the first support of the preform-gripping means and of the second support of the container-gripping means at the first end of one of the first and the second arm are controlled by a structure integral with the respective rotating support.

20. A machine according to claim 18, wherein the means ensuring that the first and/or second arm execute movements of rotation and traverses translational motion in relation to their respective rotating support, and/or the means ensuring that the support of each gripping device executes rotational movements in relation to its respective arm are constituted by cams supported by the respective rotating support and which act on additional devices made integral with the respective arm.

21. A machine according to claim 6, further comprising
a linear heat-processing device associated with an endless chain of turning devices extending between two wheels, in which two successive turning devices are spaced apart by a first distance, and
wherein the spacing-modification device constituted by a rotating plate comprising on its circumference alternating preform-retention stationary elements and mobile elements is positioned beneath one of these wheels and coaxial with it, is driven in conjunction with said wheel, and is configured so as to be usable to support the preforms at least one of the following:
during the mold-insertion step, and
between the mold-opening step and the moment they are grasped by the first transfer means.

22. A machine according to claim 21, wherein the spacing-modification means are arranged to ensure that the stationary and mobile preform-retention elements are spaced apart by the first distance, in at least one of the following areas:
the area of preform insertion in the molds, and
the area of preform removal from the molds.

23. A machine according to claim 6, further comprising a circular heat-conditioning device along with an endless chain of turning devices borne by a rotating conveyor, in which two successive turning devices are spaced apart by a first distance, and wherein the spacing-modification device formed by the rotating plate, comprising on its circumference alternating stationary and mobile preform-retention elements, is positioned on the circumference of the rotating conveyor to grasp and support the preforms after they are removed from the mold and until they are grasped by the second device.

* * * * *